United States Patent
Krishtal et al.

(10) Patent No.: US 10,581,902 B1
(45) Date of Patent: Mar. 3, 2020

(54) METHODS FOR MITIGATING DISTRIBUTED DENIAL OF SERVICE ATTACKS AND DEVICES THEREOF

(71) Applicant: F5 Networks, Inc., Seattle, WA (US)

(72) Inventors: Vadim Krishtal, Tel Aviv (IL); Peter Finkelshtein, Tel Aviv (IL); Oran Baruch, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 155 days.

(21) Appl. No.: 15/296,824

(22) Filed: Oct. 18, 2016

Related U.S. Application Data

(60) Provisional application No. 62/260,852, filed on Nov. 30, 2015.

(51) Int. Cl.
*H04W 28/02* (2009.01)
*H04L 29/06* (2006.01)

(52) U.S. Cl.
CPC .......... *H04L 63/1458* (2013.01); *H04L 63/10* (2013.01); *H04L 63/14* (2013.01); *H04L 63/1416* (2013.01); *H04L 63/1425* (2013.01); *H04L 63/20* (2013.01)

(58) Field of Classification Search
CPC ............. H04L 63/1458; H04L 63/1425; H04L 63/1416; H04L 63/1408; H04L 63/1433; H04L 47/32; H04L 63/10; H04L 63/14; H04L 63/20
See application file for complete search history.

(56) References Cited

U.S. PATENT DOCUMENTS

| | | | | |
|---|---|---|---|---|
| 4,783,828 A | * | 11/1988 | Sadjadi | G06K 9/481 382/170 |
| 5,537,488 A | * | 7/1996 | Menon | G06K 9/6222 382/170 |
| 6,118,893 A | * | 9/2000 | Li | G06T 7/0006 382/150 |
| 6,748,056 B1 | | 6/2004 | Capriotti et al. | |

(Continued)

OTHER PUBLICATIONS

BIG-IP® Analytics: Implementations, version 11.3, Nov. 15, 2012, F5 Networks, Inc., pp. 1-40.

(Continued)

*Primary Examiner* — Alexander Lagor
*Assistant Examiner* — Howard H. Louie
(74) *Attorney, Agent, or Firm* — Pepper Hamilton LLP

(57) ABSTRACT

A method, non-transitory computer readable medium, security management apparatus, and network traffic management system that monitors received HTTP requests associated with a source IP address to obtain data for one or more signals. A value for one or more bins corresponding to one or more of the signals for individual behavioral histograms and a global behavioral histogram is updated based on the signal data. The individual behavioral histograms each correspond to one of the source IP addresses. A determination is made when a DDoS attack condition is detected. When the determining indicates that the DDoS attack condition is detected, an attack pattern is identified in the global behavioral histogram and a mitigation action is initiated for one of the source IP addresses based on a correlation of one of the individual behavioral histograms, which corresponds to the one of the source IP addresses, to the attack pattern.

20 Claims, 4 Drawing Sheets

(56) References Cited

U.S. PATENT DOCUMENTS

| | | | |
|---|---|---|---|
| 6,769,066 B1* | 7/2004 | Botros | G06F 21/55 700/110 |
| 7,228,412 B2 | 6/2007 | Freed | |
| 7,441,429 B1* | 10/2008 | Nucci | H04L 63/1416 370/230 |
| 7,519,834 B1 | 4/2009 | Dondeti et al. | |
| 7,624,447 B1* | 11/2009 | Horowitz | H04L 63/0263 726/23 |
| 7,743,415 B2* | 6/2010 | Poletto | H04L 63/1408 726/23 |
| 8,572,733 B1* | 10/2013 | Rockwood | H04L 63/1433 709/224 |
| 8,943,588 B1* | 1/2015 | Speegle | H04L 63/1483 726/22 |
| 9,077,709 B1 | 7/2015 | Dall | |
| 9,578,055 B1* | 2/2017 | Khanal | H04L 63/1458 |
| 9,628,499 B1* | 4/2017 | Yu | H04L 63/1416 |
| 9,654,485 B1 | 5/2017 | Neumann | |
| 9,900,344 B2* | 2/2018 | Smith | H04L 63/1458 |
| 9,967,250 B2* | 5/2018 | Johansson | H04L 63/083 |
| 2002/0116615 A1 | 8/2002 | Nguyen et al. | |
| 2003/0042439 A1* | 3/2003 | Rusu | G01R 31/311 250/559.4 |
| 2003/0073091 A1* | 4/2003 | Krylov | G01N 33/5308 435/6.16 |
| 2003/0145232 A1* | 7/2003 | Poletto | H04L 63/1408 726/22 |
| 2003/0199762 A1* | 10/2003 | Fritz | A61B 8/0858 600/437 |
| 2004/0037326 A1* | 2/2004 | D'Souza | H04L 63/1458 370/516 |
| 2004/0103283 A1 | 5/2004 | Hornak | |
| 2004/0170123 A1* | 9/2004 | Carpenter | H04L 63/1458 370/229 |
| 2005/0027846 A1 | 2/2005 | Wolfe et al. | |
| 2005/0111367 A1* | 5/2005 | Jonathan Chao | H04L 63/1408 370/235 |
| 2005/0195840 A1* | 9/2005 | Krapp | H04L 43/0894 370/401 |
| 2005/0198519 A1* | 9/2005 | Tamura | H04L 63/1408 713/188 |
| 2006/0031483 A1* | 2/2006 | Lund | G06Q 10/107 709/224 |
| 2006/0031928 A1* | 2/2006 | Conley | H04L 63/0236 726/11 |
| 2007/0118894 A1 | 5/2007 | Bhatia | |
| 2007/0280114 A1* | 12/2007 | Chao | H04L 43/0888 370/235.1 |
| 2007/0294187 A1* | 12/2007 | Scherrer | G06Q 20/401 705/75 |
| 2008/0028467 A1 | 1/2008 | Kommareddy et al. | |
| 2008/0263215 A1 | 10/2008 | Schnellbaecher | |
| 2008/0320567 A1 | 12/2008 | Shulman et al. | |
| 2009/0199297 A1 | 8/2009 | Jarrett et al. | |
| 2010/0031315 A1 | 2/2010 | Feng et al. | |
| 2010/0070451 A1* | 3/2010 | Hugues | H04L 45/02 706/49 |
| 2010/0284282 A1* | 11/2010 | Golic | H04L 43/022 370/242 |
| 2010/0325418 A1 | 12/2010 | Kanekar | |
| 2011/0012586 A1* | 1/2011 | Montanari | G01R 31/1272 324/76.77 |
| 2011/0072516 A1 | 3/2011 | Cohen et al. | |
| 2011/0154026 A1 | 6/2011 | Edstrom | |
| 2011/0264905 A1 | 10/2011 | Ovsiannikov | |
| 2012/0079592 A1* | 3/2012 | Pandrangi | H04L 47/10 726/22 |
| 2012/0144487 A1 | 6/2012 | Kim et al. | |
| 2012/0167210 A1* | 6/2012 | Oro Garcia | H04L 63/1425 726/22 |
| 2012/0173710 A1* | 7/2012 | Rodriguez | H04L 43/026 709/224 |
| 2012/0323700 A1 | 12/2012 | Aleksandrovich et al. | |
| 2013/0080407 A1* | 3/2013 | Levow | G06F 17/30348 707/692 |
| 2013/0276114 A1 | 10/2013 | Friedrichs et al. | |
| 2014/0095865 A1 | 4/2014 | Yerra | |
| 2014/0157405 A1* | 6/2014 | Joll | H04L 43/1425 726/22 |
| 2014/0289854 A1* | 9/2014 | Mahvi | H04L 63/1416 726/23 |
| 2014/0298419 A1 | 10/2014 | Boubez | |
| 2014/0317739 A1 | 10/2014 | Be'ery et al. | |
| 2015/0067328 A1 | 3/2015 | Yin | |
| 2015/0088662 A1* | 3/2015 | Noller | G06Q 30/02 705/14.66 |
| 2015/0163234 A1 | 6/2015 | Tal et al. | |
| 2015/0310196 A1 | 6/2015 | Turgeman et al. | |
| 2015/0215334 A1* | 7/2015 | Bingham | G06N 99/005 726/23 |
| 2015/0271179 A1 | 9/2015 | Wang et al. | |
| 2015/0295945 A1 | 10/2015 | Canzanese et al. | |
| 2016/0021117 A1* | 1/2016 | Harmon | H04L 63/20 726/1 |
| 2016/0127406 A1* | 5/2016 | Smith | H04L 63/1458 726/23 |
| 2016/0352774 A1* | 12/2016 | Akcin | H04L 63/1441 |
| 2017/0171231 A1* | 6/2017 | Reybok, Jr. | H04L 63/1416 |
| 2017/0249306 A1* | 8/2017 | Allen | G06F 17/30029 |
| 2017/0318053 A1* | 11/2017 | Singh | H04L 63/1491 |
| 2018/0124300 A1* | 5/2018 | Brook | H04N 5/2356 |

OTHER PUBLICATIONS

F5 Networks, "BIG-IP Local Traffic Manager: Concepts", version 11.4, pp. 1-178, retrieved from https://support.f5.com/kb/en-us/products/big-ip_ltm/manuals/product/ltm-concepts-11-4-0.html on Feb. 12, 2015.

F5 Networks, "BIG-IP Local Traffic Manager: Implementations", version 11.4, pp. 1-234, retrieved from https://support.f5.com/kb/en-us/products/big-ip_ltm/manuals/product/ltm-implementations-11-4-0.html on Feb. 12, 2015.

F5 Networks, "BIG-IP Local Traffic Manager: Monitors Reference", version 11.4, pp. 1-106, retrieved from https://support.f5.com/kb/en-us/products/big-ip_ltm/manuals/product/ltm-monitors-reference-11-4-0.html on Feb. 12, 2015.

F5 Networks, "Operations Guide 1.0 F5 Local Traffic Manager and Global Traffic Manager", pp. 1.144, retrieved from https://support.f5.com/kb/en-us/products/big-ip_ltm/manuals/product/f5-ltm-gtm-operations-guide-1-0.html on Feb. 12, 2015.

F5 Networks, "Release Note: BIG-IP LTM and TMOS", version 11.4.1, pp. 1-58, retrieved from https://support.f5.com/kb/en-us/products/big-ip_ltm/releasenotes/product/relnote-ltm-11-4-1.html on Feb. 12, 2015.

F5 Networks, Inc., "BIG-IP Application Security Manager Operations Guide", Manual, Feb. 5, 2016, pp. 1-181, F5 Networks, Inc.

F5 Networks, Inc., "BIG-IP ASM 11.5.0", Release Notes, Apr. 12, 2016, Version 11.5.0.

F5 Networks, Inc., "BIG-IP ASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, Inc.

F5 Networks, Inc., "BIG-IP® Application Security Manager™: Getting Started", Manual, Aug. 25, 2014, pp. 1-78, version 11.6, F5 Networks, Inc.

F5 Networks, Inc., "BIG-IP® Application Security Manager™: Implementations", Manual, Aug. 25, 2014, pp. 1-420, version 11.6, F5 Networks, Inc.

F5 Networks, Inc., "BIG-IP® Application Security Manager™: Implementations", Manual, Jan. 31, 2014, pp. 1-396, Version 11.5.

F5 Networks, Inc., "BIG-IP® Application Security Manager™: Implementations", F5 Networks, Inc., Dec. 10, 2014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

(56) References Cited

OTHER PUBLICATIONS

F5 Networks, Inc., "BIG-IP® Network Firewall: Policies and Implementations", Manual, Aug. 10, 2016, pp. 1-166, v11.6, F5 Networks, Inc.

F5 Networks, Inc., "BIG-IP® Systems: DoS Protection and Protocol Firewall Implementations", Manual, Aug. 25, 2014, pp. 1-108, v11.6, F5 Networks, Inc.

F5 Networks, Inc., "BIG-IP® TMOS®: Concepts", Manual, Nov. 11, 2014, pp. 1-148, Version 11.5.

F5 Networks, Inc., "BIG-IP® TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, Inc.

F5 Networks, Inc., "BIG-IP® Local Traffic Management: Basics", Manual, Aug. 25, 2014, pp. 1-74, v11.6, F5 Networks, Inc.

F5 Networks, Inc., "BIG-IP® Application Security Manager™: Getting Started", Manual, Aug. 25, 2014, pp. 1-78, v11.6, F5 Networks, Inc.

F5 Networks, Inc., "BIG-IP® Application Security Manager™: Implementations", Manual, Aug. 25, 2014, pp. 1-420, v11.6, F5 Networks, Inc.

\* cited by examiner

| Signal | Bins | Description |
|---|---|---|
| REQ_HDR_SIZE | 12 | log2 scale for ranges 2^4...2^15, last bin >=2^15 |
| REQ_DATA_SIZE | 16 | log2 scale for ranges 0...2^2^20, last bin > 2^20 |
| REFFERER | 64 | hash of header value |
| HOST | 64 | hash of header value |
| CONTENT_TYPE | 64 | hash of header value |
| COOKIE_NAME | 64 | hash combined cookie names |
| UA | 16 | user agent keywords match |
| FILENAME | 64 | hash of uri without parameters |
| METHOD | 32 | hash of method |
| CACHE_CTRL | 16 | hash of header value |
| HEADERS_COUNT | 64 | linear scale for number of headers, last bin > 63 headers |
| HEADERS | 32 | known headers existing by http headers enum index |
| HEADERS_INV | 32 | known headers not existence http headers enum index |
| URI_PARAMS_COUNT | 32 | linear scale for number of URI parameters splitted by &, last bin > 31 |
| URI_LEN | 32 | linear scale from 0 ...512, last > 512 |
| ACCEPT | 32 | keywords match |
| ACCEPT_CHARSET | 64 | keywords match |

METHODS FOR MITIGATING DISTRIBUTED DENIAL OF SERVICE ATTACKS AND DEVICES THEREOF

This application claims the benefit of U.S. Provisional Patent Application Ser. No. 62/260,852, filed on Nov. 30, 2015, which is hereby incorporated by reference in its entirety.

FIELD

This technology generally relates to network security and, more particularly, to methods and devices for mitigating distributed denial of service attacks.

BACKGROUND

Many networks storing data, such as web applications, web pages, or other content, include traffic management computing devices that, among other functions, protect server devices storing the data from malicious attacks. One such set of attacks are denial of service (DoS) or distributed denial of service (DDoS) attacks (commonly referred to herein as DDoS attacks), although many other types of malicious attacks exist. DDoS attacks can be identified based on an increased volume of traffic received by traffic management computing devices that can impact the health of the server devices protected by the traffic management computing devices. In particular, certain Internet Protocol (IP) address can be identified as sources of relatively high volumes of network traffic, and mitigation actions can be initiated on those IP addresses.

However, current methods of identifying an attack condition are often unable to distinguish between a normal increase in network traffic volume and an increase in network traffic volume that is indicative of an attack. Additionally, volumetric methods for identifying certain attackers are not effective when multiple attackers are each placing a below average load on the network traffic management device(s) and/or server(s), but are together resulting in a DDoS attack. Accordingly, current methods often fail to accurately identify attackers, resulting in a relatively high number of false positives, resets of an increased number of good connections, and/or blocking of a relatively large amount of benign traffic.

SUMMARY

A method for mitigating DDoS attacks, implemented by a network traffic management system comprising one or more security management apparatuses or server devices, includes monitoring received HTTP requests associated with a source IP address to obtain data for one or more signals. A value for one or more bins corresponding to one or more of the signals for individual behavioral histograms and a global behavioral histogram is updated based on the signal data. The individual behavioral histograms each correspond to one of the source IP addresses. A determination is made when a DDoS attack condition is detected. When the determining indicates that the DDoS attack condition is detected, an attack pattern is identified in the global behavioral histogram and a mitigation action is initiated for one of the source IP addresses based on a correlation of one of the individual behavioral histograms, which corresponds to the one of the source IP addresses, to the attack pattern.

A security management apparatus includes memory including programmed instructions stored thereon and one or more processors configured to be capable of executing the stored programmed instructions to monitor received HTTP requests associated with a source IP address to obtain data for one or more signals. A value for one or more bins corresponding to one or more of the signals for individual behavioral histograms and a global behavioral histogram is updated based on the signal data. The individual behavioral histograms each correspond to one of the source IP addresses. A determination is made when a DDoS attack condition is detected. When the determining indicates that the DDoS attack condition is detected, an attack pattern is identified in the global behavioral histogram and a mitigation action is initiated for one of the source IP addresses based on a correlation of one of the individual behavioral histograms, which corresponds to the one of the source IP addresses, to the attack pattern.

A non-transitory computer readable medium having stored thereon instructions for mitigating DDoS attacks includes executable code which when executed by one or more processors, causes the one or more processors to monitor received HTTP requests associated with a source IP address to obtain data for one or more signals. A value for one or more bins corresponding to one or more of the signals for individual behavioral histograms and a global behavioral histogram is updated based on the signal data. The individual behavioral histograms each correspond to one of the source IP addresses. A determination is made when a DDoS attack condition is detected. When the determining indicates that the DDoS attack condition is detected, an attack pattern is identified in the global behavioral histogram and a mitigation action is initiated for one of the source IP addresses based on a correlation of one of the individual behavioral histograms, which corresponds to the one of the source IP addresses, to the attack pattern.

A network traffic management system, comprising one or more security management apparatuses or server devices, the network traffic management system comprising memory comprising programmed instructions stored thereon and one or more processors configured to be capable of executing the stored programmed instructions to monitor received HTTP requests associated with a source IP address to obtain data for one or more signals. A value for one or more bins corresponding to one or more of the signals for individual behavioral histograms and a global behavioral histogram is updated based on the signal data. The individual behavioral histograms each correspond to one of the source IP addresses. A determination is made when a DDoS attack condition is detected. When the determining indicates that the DDoS attack condition is detected, an attack pattern is identified in the global behavioral histogram and a mitigation action is initiated for one of the source IP addresses based on a correlation of one of the individual behavioral histograms, which corresponds to the one of the source IP addresses, to the attack pattern.

This technology has a number of associated advantages including methods, non-transitory computer readable media, and security management apparatuses that provide improved network security and more effectively mitigate DDoS network attacks. With this technology, malicious actors contributing to a DDoS attack can be more accurately identified, even though the volume of traffic from each of the malicious attackers may be relatively low or below average for a network. Accordingly, this technology facilitates fewer false positives and fewer mitigation actions initiated on benign network traffic.

BRIEF DESCRIPTION OF THE DRAWINGS

FIG. 5 is a table of exemplary signals for which data is obtained by the security management apparatus.

DETAILED DESCRIPTION

Figure 1:
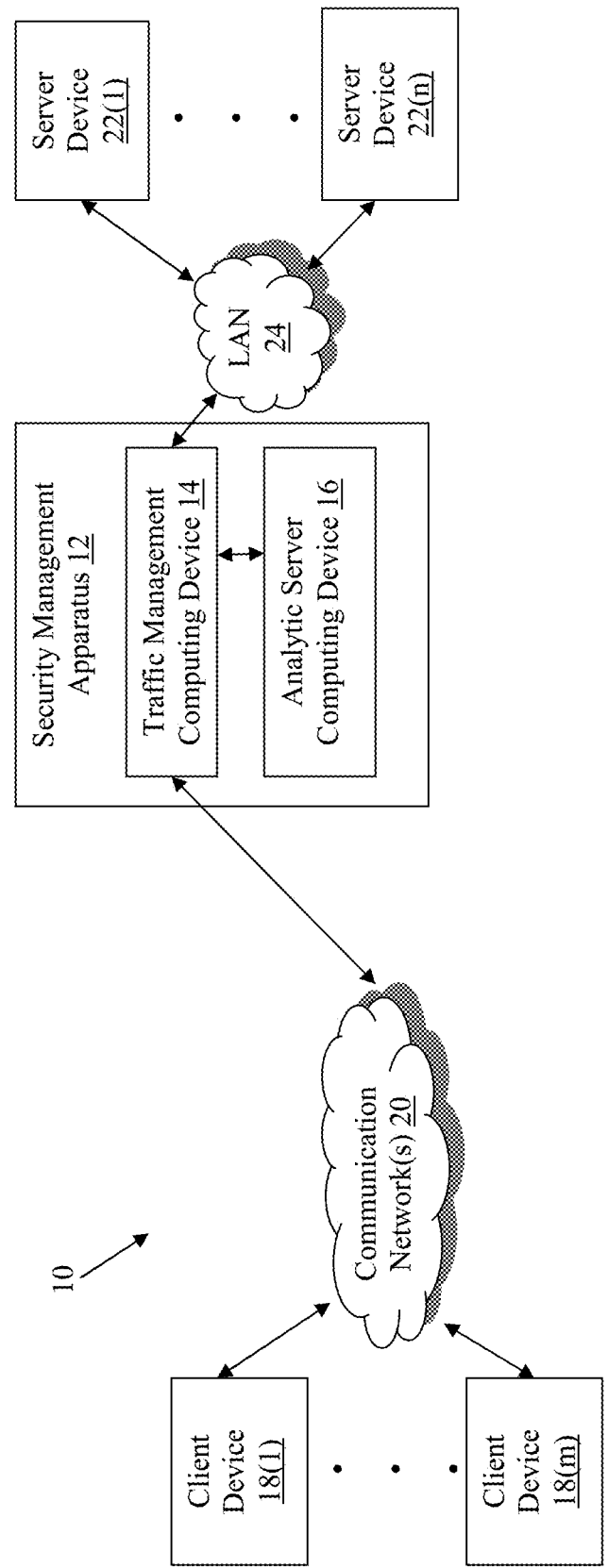
FIG. 1 is a system diagram of a network environment with an exemplary security management apparatus.

An exemplary network environment 10 including an exemplary security management apparatus 12 with a traffic management computing device 14 and an analytic server computing device 16 is illustrated in FIG. 1. In this example, the traffic management computing device 14 is coupled to client devices 18(1)-18(m) through communication network(s) 20, server devices 22(1)-22(n) through a local area network (LAN) 24, and the analytic server computing device 16 through a direct connection, although the traffic management computing device 14, client devices 18(1)-18(m), server devices 22(1)-22(n), and analytic server computing device 16 may be coupled together via other topologies. The network environment 10 may also include other network devices, such as one or more routers and/or switches, by way of example only, which are well known in the art and thus will not be described herein. This technology provides a number of advantages including methods, non-transitory computer readable media, and security management apparatuses that more accurately and effectively identify, and mitigate the impact of, malicious sources of network traffic associated with a DDoS attack.

Figure 2:
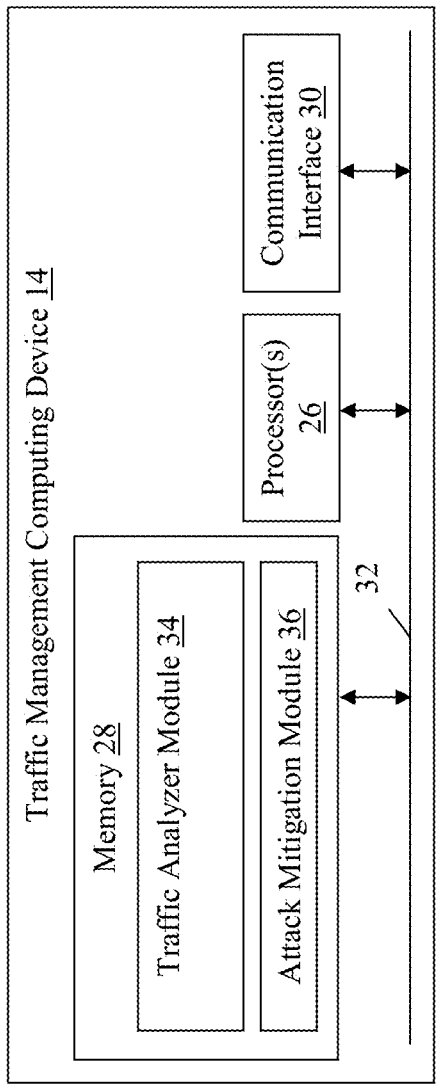
FIG. 2 is a block diagram of the exemplary traffic management computing device shown in FIG. 1.

Referring to FIGS. 1-2, the traffic management computing device 14 may perform any number of functions in addition to mitigating DDoS attacks including accelerating and optimizing network traffic communicated between the server devices 22(1)-22(n) and client devices 18(1)-18(m) in order to improve the user experience. The traffic management computing device 14 also can perform other functions on the network traffic, such as traffic management, load balancing the network traffic to the server devices 22(1)-22(n) and/or implementing firewalls or other security measures on behalf of web applications executing on the server devices 22(1)-22(n), by way of example only. The traffic management computing device 14 includes processor(s) 26, a memory 28, and a communication interface 30, which are coupled together by a bus 32 or other communication link, although the traffic management computing device 14 may include other types and/or numbers of elements in other configurations.

The processor(s) 26 of the traffic management computing device 14 may execute programmed instructions for any number of the functions identified above and/or described herein for detecting malicious network traffic and, optionally, managing network traffic and/or optimizing service of content requests, by way of example only. The processor(s) 26 of the traffic management computing device 14 may include one or more central processing units and/or general purpose processors with one or more processing cores, by way of example only, although other types of processor(s) also can be used.

The memory 28 of the traffic management computing device 14 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), flash, hard disk drives, solid state drives, or other computer readable medium which is read from and written to by a magnetic, optical, or other reading and writing system that is coupled to the processor(s) 26, can be used for the memory 28.

Figure 4:
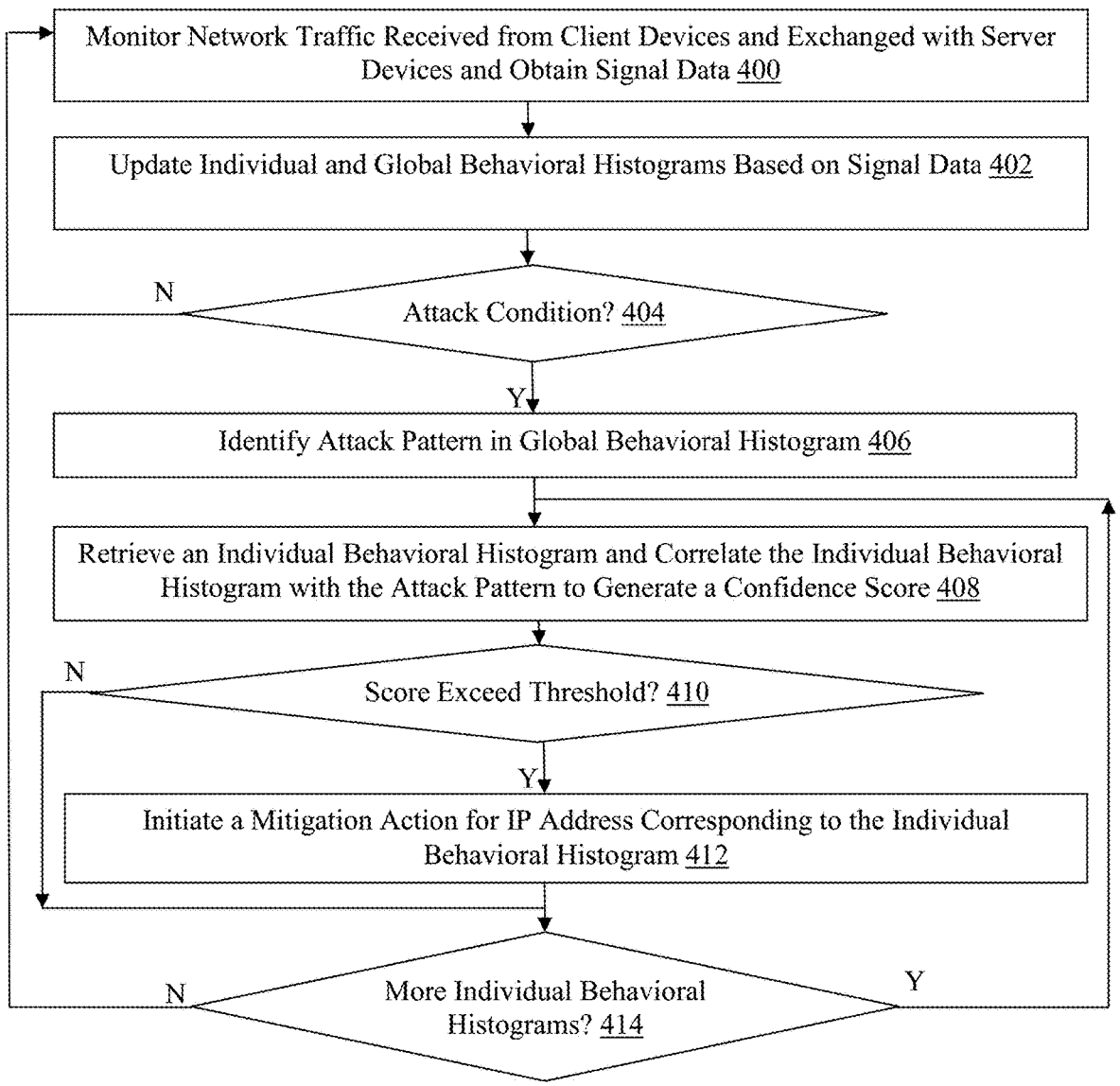
FIG. 4 is a flowchart of an exemplary method for identifying sources of network traffic causing a DDoS attack, and mitigating the impact of the DDoS attack.

Accordingly, the memory 28 of the traffic management computing device 14 can store one or more applications that can include computer executable instructions that, when executed by the traffic management computing device 14, cause the traffic management computing device 14 to perform actions, such as to transmit, receive, or otherwise process messages, by way of example only, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the traffic management computing device 14 itself, may be located in virtual server(s) running in a cloud-based computing environment rather than being tied to one or more specific physical network computing devices. Also, the application(s) may be running in one or more virtual machines (VMs) executing on the traffic management computing device 14. Additionally, in one or more embodiments of this technology, virtual machine(s) running on the traffic management computing device 14 may be managed or supervised by a hypervisor.

In this particular example, the memory 28 further includes a traffic analyzer module 34 and an attack mitigation module 36, although other modules can also be provided in other examples. The traffic analyzer module 34 obtains signal data from client-side network traffic based on stored configurations, maintains individual and global behavioral histograms based on the signal data, and applies models corresponding to attack patterns to the global behavioral histogram to determine whether an attack condition exists, as described and illustrated in more detail later.

The attack mitigation module 36 correlates an identified attack pattern with the individual behavioral histograms and initiates a mitigation action on one or more of the IP addresses based on the correlation. In some examples, the attack mitigation module 36 generates confidence scores, based on the correlation, that correspond to a likelihood that the IP addresses associated with the individual behavioral histograms is contributing to the DDoS attack condition. In these examples, the attack mitigation module 36 can initiate a mitigation action that results in dropping packets for IP addresses associated with relatively high confidence scores at a rate that is proportional to the confidence scores, also as described and illustrated in more detail later.

The communication interface 30 of the traffic management computing device 14 operatively couples and communicates between the traffic management computing device 14, client devices 18(1)-18(m), server devices 22(1)-22(n), and analytic server computing device 16, which are all coupled together by the LAN 24, communication network(s) 20 and direct connection(s), although other types and/or numbers of communication networks or systems with other types and/or numbers of connections and configurations to other devices and elements. By way of example only, the LAN 24 and communication network(s) 20 can use TCP/IP over Ethernet and industry-standard protocols, including NFS, CIFS, SOAP, XML, LDAP, and SNMP, although other types and/or numbers of communication networks, can be used.

Figure 3:
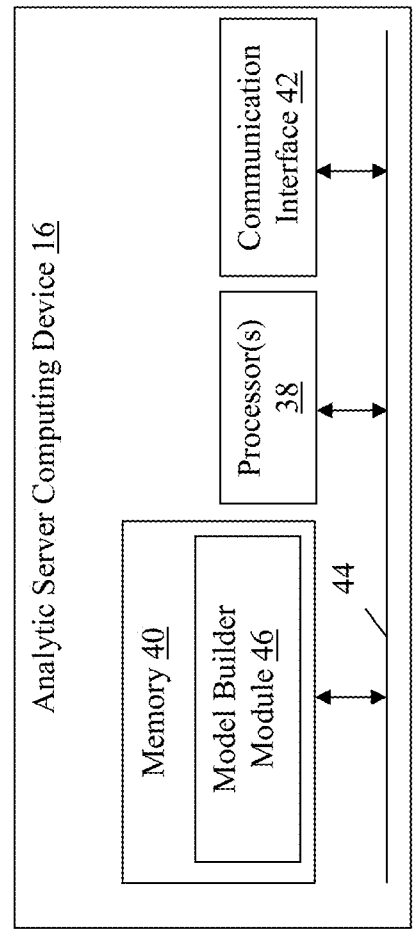
FIG. 3 is a block diagram of the exemplary analytic server computing device shown in FIG. 1.

Referring to FIGS. 1-3, the analytic server computing device 16 is configured to process signal data received from the traffic management computing device 14 and generate server health models that facilitate subsequent network traffic analysis by the traffic management computing device 14. While the analytic server computing device 16 is illustrated in this particular example as a separate device that allows significant processing related to model generation and machine learning to be performed separate from the traffic management computing device 14, in other examples, the functionality provided by the analytic server computing device 16 can be performed by analytic modules included in the memory 28 of the traffic management computing device 14.

In yet other examples, the analytic server computing device 16 can be located in a local network or outside of a local network and accessible via a cloud architecture, by way of example only. Other configurations of the traffic management computing device 14 and analytic server computing device 16, including model generators thereof, also can be used. In this particular example, the analytic server computing device 16 includes processor(s) 38, a memory 40, and a communication interface 42, which are coupled together by a bus 44 or other communication link, although the analytic server computing device 16 may include other types and/or numbers of elements in other configurations.

The processor(s) 38 of the analytic server computing device 16 may execute programmed instructions for any number of the functions identified above and/or described herein for generating models that facilitate the identification of attack conditions by the traffic management. The processor(s) 38 of the analytic server computing device 16 may include one or more central processing units and/or general purpose processors with one or more processing cores, by way of example only.

The memory 40 of the analytic server computing device 16 stores these programmed instructions for one or more aspects of the present technology as described and illustrated herein, although some or all of the programmed instructions could be stored and executed elsewhere. A variety of different types of memory storage devices, such as random access memory (RAM), read only memory (ROM), flash memory, hard disk drives, solid state drives, or other computer readable medium which is read from and written to by a magnetic, optical, or other reading and writing system that is coupled to the processor(s) 38, can be used for the memory 40.

Accordingly, the memory 40 of the analytic server computing device 16 can store one or more applications that can include computer executable instructions that, when executed by the analytic server computing device, cause the analytic server computing device 16 to perform actions, such as to transmit, receive, or otherwise process messages, by way of example only, and to perform other actions described and illustrated below with reference to FIGS. 4-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the analytic server computing device 16 itself, may be located in virtual server(s) running in a cloud-based computing environment rather than being tied to one or more specific physical network computing devices. Also, the application(s) may be running in one or more virtual machines (VMs) executing on the analytic server computing device 16. Additionally, in one or more embodiments of this technology, virtual machine(s) running on the analytic server computing device 16 may be managed or supervised by a hypervisor.

In this particular example, the memory 40 of the analytic server computing device 16 further includes a model builder module 46 configured to dynamically generate models that can be applied by the traffic management computing device 14 to identify anomalies in client-side signal data, and particularly in the signal data maintained and organized by the traffic analyzer module 34 of the traffic management computing device 14 in a global behavioral histogram. Accordingly, the model builder module 46 can analyze signal data over time and determine thresholds for various signals that, when one or more are exceeded, indicate that an attack condition exists and facilitate the identification of sources of anomalous network traffic that are causing the attack condition, as described and illustrated in more detail later.

The communication interface 42 of the analytic server computing device 16 operatively couples and communicates with the traffic management computing device 14, which is coupled to the analytic server computing device 16 by a direct connection or LAN (not shown), although other types and/or numbers of communication networks or systems with other types and/or numbers of connections and configurations to other devices and elements also can be used.

Each of the server devices **22(1)-22(*n*) in this example include one or more processors, a memory, and a communication interface, which are coupled together by a bus or other communication link, although other numbers and types of network devices could be used. The server devices 22(1)-22(*n*) in this example process requests received from the client devices 18(1)-18(*m*) via the communication network(s) 20 according to the HTTP-based application RFC protocol, by way of example only. Various applications may be operating on the server devices 22(1)-22(*n*) and transmitting data (e.g., files or Web pages) to the client devices 18(1)-18(*m*) via the traffic management computing device 14 in response to requests from the client devices 18(1)-18(*m*). The server devices 22(1)-22(*n*)** may be hardware or software or may represent a system with multiple servers in a pool, which may include internal or external networks.

Although the server devices **22(1)-22(*n*) are illustrated as single devices, one or more actions of one or more of the server devices 22(1)-22(*n*) may be distributed across one or more distinct network computing devices that together comprise one or more of the server devices 22(1)-22(*n*). Moreover, the server devices 22(1)-22(*n*) are not limited to a particular configuration. Thus, the server devices 22(1)-22(*n*) may contain a plurality of network computing devices that operate using a master/slave approach, whereby one of the network computing devices of the server devices 22(1)-22(*n*) operate to manage and/or otherwise coordinate operations of the other network computing devices. The server devices 22(1)-22(*n*)** may operate as a plurality of network computing devices within a cluster architecture, a peer-to-peer architecture, virtual machines, or within a cloud architecture, by way of example only.

Thus, the technology disclosed herein is not to be construed as being limited to a single environment and other configurations and architectures are also envisaged. By way of example only, one or more of the server devices 22(1)-22(n) can operate within the traffic management computing device 14 itself, rather than as a stand-alone server device. In this example, the one or more of the server devices 22(1)-22(n) operate within the memory 28 of the traffic management computing device 14.

The client devices 18(1)-18(m) in this example include any type of computing device that can generate, receive, and process network traffic, such as mobile computing devices, desktop computing devices, laptop computing devices, tablet computing devices, virtual machines (including cloud-based computers), or the like. Each of the client devices in this example includes a processor, a memory, and a communication interface, which are coupled together by a bus or other communication link, although other numbers and types of network devices could be used.

The client devices 18(1)-18(m) may run interface applications, such as standard web browsers or standalone client applications, which may provide an interface to make requests for, and receive content stored on, one or more of the server devices 22(1)-22(n) via the communication network(s) 20. The client devices 18(1)-18(m) may further include a display device, such as a display screen or touchscreen, and/or an input device, such as a keyboard by way of example only.

Although the exemplary network environment 10 with the traffic management computing device 14, client devices 18(1)-18(m), server devices 22(1)-22(n), analytic server computing device 16, LAN 24, and communication network(s) 20 are described and illustrated herein, other types and/or numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 10, such as the traffic management computing device 14, client devices 18(1)-18(m), server devices 22(1)-22(n), or analytic server computing device 16, by way of example only, may be configured to operate as virtual instances on the same physical machine. In other words, one or more of the traffic management computing device 14, client devices 18(1)-18(m), server devices 22(1)-22(n), or analytic server computing device 16 may operate on the same physical device rather than as separate devices communicating through communication network(s). Additionally, there may be more or fewer traffic management computing devices, client devices, server devices, or analytic server computing devices than illustrated in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples may also be embodied as non-transitory computer readable media having instructions stored thereon for one or more aspects of the present technology as described and illustrated by way of the examples herein, as described herein, which when executed by a processor, cause the processor to carry out the steps necessary to implement the methods of the examples, as described and illustrated herein.

Exemplary methods for mitigating DDoS attacks will now be described with reference to FIGS. 1-5. Referring more specifically to FIG. 4, a method for identifying sources of network traffic causing a DDoS attack, and mitigating the DDoS attack, is illustrated. In step 400 in this example, the security management apparatus 12 monitors network traffic including HyperText Transport Protocol (HTTP) requests received from the client devices 18(1)-18(m) to obtain client-side signal data for a plurality of signals in accordance with stored configuration(s). The monitoring of the network traffic received from the client devices 18(1)-18(m) can be performed by the traffic analyzer module 34 of the traffic management computing device 14, for example.

Referring more specifically to FIG. 5, a table 500 of exemplary signals for which data is obtained by the security management apparatus 12 is illustrated. In this particular example, the signals can relate to any characteristics of received HTTP request network traffic. Accordingly, the signal data can include a number and type of HTTP methods (e.g., GET and POST), web browser type or user agent value, device type (e.g., bots, desktop, or mobile), number or value of HTTP headers, the existence of HTTP headers, or HTTP request content type, for example, although any other signals relating to observed network traffic originating with the client devices 18(1)-18(m) can also be used.

Referring back to FIG. 4, in step 402, the security management apparatus 12 updates individual and global behavioral histograms based on the signal data obtained in step 400. Each of the individual histograms corresponds to an Internet Protocol (IP) address, which can be virtual and that is associated with one of the client devices 18(1)-18(m), or another source of network traffic, as indicated in the source IP address of the received network traffic, for example. The global histogram reflects the signal data for more than one or all of the IP addresses from which network traffic has been received. The individual and global histograms each include a plurality of bins, various subsets of which correspond to each of the signals for which data is obtained in step 400.

Referring back to FIG. 5, the table 500 illustrated in this example also includes an indication of a number of bins associated with each of the signals, as well as a description of a conversion of the signal data retrieved from the network traffic to a value that is used to increment a bin value. In one example, a hash is generated for the "content_type" signal corresponding to the type of the content associated with an HTTP request. Accordingly, in this example, a hash value is generated from the requested content type and the value of a bin corresponding to the hash value is incremented in both the individual behavioral histogram, associated with the source IP address indicated in the HTTP request, and the global behavioral histogram. Other numbers of bins, methods of generating the bin value(s), or methods of maintaining or updating the individual and/or global behavioral histograms can also be used.

Referring again to FIG. 4, in step 404, the security management apparatus 12 determines whether an attack condition is detected. In one example, the model builder module 46 of the analytic server computing device 16 generates model(s) that include threshold value(s) for bin(s) of the global behavioral histogram. The thresholds can be determined over time based on historical signal data and can represent excessive or anomalous volume levels outside of an expected or normal range.

Accordingly, bin value(s) within the threshold can correspond with expected or benign network traffic behavior. Therefore, an attack condition can be determined when an established number or set of threshold bin values have been exceeded in the global behavioral histogram based on a stored configuration or one of the models generated and provided by the analytic server computing device 16, for example. Other methods of determining whether an attack condition is detected using the global behavioral histogram can also be used. If the security management apparatus 12 determines that an attack condition is not detected, then the No branch is taken back to step 400 and the security management apparatus 12 continues monitoring network traffic, as described and illustrated earlier.

However, if the security management apparatus 12 determines that an attack condition is detected, then the Yes branch is taken to step 406. In step 406, the security management apparatus 12 identifies an attack pattern in the global behavioral histogram. In one example, the attack pattern corresponds to the set of bins for which a threshold value has been exceeded resulting in the detection of the attack condition in step 404, although other types of attack patterns can also be identified in step 406 in other examples.

In step 408, the security management apparatus 12 retrieves an individual behavioral histogram and correlates the individual behavioral histogram with the attack pattern to generate a confidence score. The correlation between the individual behavioral histogram and the attack pattern can be performed based on a cosine similarity or other histogram comparison method, for example. The correlation in this example results in an indication of the extent of the deviations in the values in the individual behavioral histogram of the bins associated with the attack pattern.

Accordingly, in one particular example, the value of each of the bins corresponding to a certain hash of the "content_type" header value, a certain hash of the "cache_ctrl" header value, and a certain number of headers, exceed their respective thresholds by 10%, 22%, and 18%, which in this example is sufficient based on a model or stored configuration to detect an attack condition in step 404. Additionally, the security management apparatus 12 in this example identifies the attack pattern as elevated number of certain hashes of "content_type" header values, "cache_ctrl" header values, and a total number of headers. In this example, the attack pattern is correlated with the retrieved individual behavioral histogram to determine whether and to what extent the attack pattern is represented in the individual behavioral histogram.

In one example, the extent of the correspondence can be used to generate a confidence score corresponding to a likelihood of contribution of the IP addresses associated with the individual behavioral histogram to the DDoS attack condition. Accordingly, an IP address that contributes to the DDoS attack can be identified even if the overall volume of network traffic received from the IP address is not anomalous, or is even less than average. Therefore, malicious actors contributing to a DDoS attack, each with a relatively low volume of network traffic, can advantageously be more accurately identified with this technology.

In step 410, the security management apparatus 12 optionally determines whether the confidence score generated in step 408 exceeds an established threshold. The threshold can correspond to a confidence level that represents confidence of at least some contribution by an IP address to the detected attack condition. In some examples, the threshold can be a confidence score indicating above 90% confidence that the IP address is contributing to the detected attack condition in order to reduce the number of false positive and to only initiate a mitigation action on IP addresses for which there is a relatively high confidence of a contribution to the detected attack condition.

In other examples, the threshold can be a confidence score indicating above 50% confidence that the IP address is contributing to the detected attack condition in order to initiate a mitigation action for all IP address that are more likely than not contributing to the detected attack condition. Other confidence scores and thresholds can be used in other examples. Accordingly, if the security management apparatus 12 determines in step 410 that the confidence score generated in step 408 exceeds the threshold, then the Yes branch is taken to step 412.

In step 412, the security management apparatus 12 initiates a mitigation action for the IP address corresponding to the individual behavioral histogram retrieved in step 408. The mitigation action can be initiated by the attack mitigation module 36, for example, and can include blocking network traffic originating from the IP address, intentionally dropping packets originating from the IP address, or presenting one of the client devices 18(1)-18(m) associated with the IP address with a challenge before proceeding to accept network traffic in order to confirm the one of the client devices 18(1)-18(m) is not a malicious bot, for example.

In one particular example, the mitigation action includes randomly dropping received packets corresponding to the IP address at a rate determined based on, or proportional to, the confidence score. In this example, the security management apparatus 12 advantageously drops packets received from IP addresses that the security management apparatus 12 has a relatively high confidence are contributing to the detected attack condition at a higher rate. Other types and numbers of mitigation actions intended to defend one or more of the server devices 22(1)-22(n) can also be initiated in other examples. Subsequent to initiating the mitigation action, or if the security management apparatus 12 determines in step 410 that the confidence score does not exceed the threshold and the No branch is taken, the security management apparatus 12 proceeds to step 414.

In step 414, the security management apparatus 12 determines whether there are more individual behavioral histograms. If the security management apparatus 12 determines that there are more individual behavioral histograms, then the Yes branch is taken back to step 408, and the security management apparatus 12 determines whether and to what extent a mitigation action should be initiated for another IP address associated with another individual behavioral histogram, as described and illustrated earlier with reference to steps 408-412.

However, if the security management apparatus 12 determines in step 414 that there are no more individual behavioral histograms, then the No branch is taken back to step 400 in this example. In other examples, the security management apparatus 12 can also determine whether the attack condition still currently exists or whether initiated mitigation action should continue. Additionally, one or more of steps 400-414 illustrated in FIG. 4 can be performed by the security management apparatus 12 in parallel.

With this technology, malicious attackers contributing to a DDoS attack can be more accurately identified, even though the volume of traffic from each of the malicious attackers may be relatively low or below average for a network. Accordingly, with this technology, there are fewer false positives and fewer mitigation actions initiated on good or non-malicious IP addresses. Additionally, this technology in some examples advantageously utilizes a confidence score that reflects the likelihood that an IP address is a source of malicious network traffic contributing to an attack, and proportionally drops packets from IP addresses based on the confidence score. Thereby, IP addresses that are less likely to be sources of malicious traffic are impacted less by the mitigation actions taken in the network.

Having thus described the basic concept of the disclosed technology, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the disclosed technology. Additionally, the recited order of processing elements or sequences, or the use of numbers, letters, or other designations therefore, is not intended to limit the claimed processes to any order except as may be specified in the claims. Accordingly, the disclosed technology is limited only by the following claims and equivalents thereto.

What is claimed is:

1. A method for mitigating network attacks implemented by a network traffic management system comprising one or more security management apparatuses or server devices, the method comprising:

monitoring received requests associated with source Internet Protocol (IP) addresses to obtain data for signals;

updating bins corresponding to one or more of the signals for individual behavioral histograms and a global behavioral histogram based on the signal data, wherein each of the individual behavioral histograms comprises two or more of the bins and corresponds to one of the source IP addresses and each of the two or more of the bins maintains a number of the requests associated with the one of the source IP addresses that include a respective value for an associated one of the signals; and upon detecting a network attack, identifying an attack pattern in the global behavioral histogram and initiating a mitigation action for another of the source IP addresses based on a correlation of one of the individual behavioral histograms to the attack pattern, wherein the one of the individual behavioral histograms corresponds to the another of the source IP addresses, wherein initiating the mitigation action for the another of the source IP addresses comprises:

using an amount of the correlation to generate a confidence score for the another of the source IP addresses, the confidence score being a measure of a likelihood of the another of the source IP addresses contributing to the network attack associated with the attack pattern;

determining that the confidence score for the another of the source IP addresses exceeds a threshold score; and in response to determining that the confidence score for the another of the source IP addresses exceeds the threshold score, selectively dropping packets from the another of the source IP addresses at a rate proportional to the likelihood of the another of the source IP addresses contributing to the network attack associated with the attack pattern.

2. The method of claim 1, wherein selectively dropping packets from the another of the source IP addresses comprises randomly dropping one or more received packets corresponding to the another of the source IP addresses at the rate proportional to the confidence score.

3. The method of claim 1, further comprising identifying the attack pattern in the global behavioral histogram based on a deviation of one or more values of one or more of the bins of the global behavioral histogram from a threshold value.

4. The method of claim 1, wherein the threshold score is representative of the another of the source IP addresses being more likely than not of contributing to the network attack associated with the attack pattern.

5. The method of claim 1, wherein the network attack is detected by comparing the global behavioral histogram to a plurality of stored model histograms.

6. A non-transitory computer readable medium having stored thereon instructions for mitigating network attacks comprising executable code which when executed by one or more processors, causes the one or more processors to:

monitor received requests associated with source Internet Protocol (IP) addresses to obtain data for signals;

update bins corresponding to one or more of the signals for individual behavioral histograms and a global behavioral histogram based on the signal data, wherein each of the individual behavioral histograms comprises two or more of the bins and corresponds to one of the source IP addresses and each of the two or more of the bins maintains a number of the requests associated with the one of the source IP addresses that include a respective value for an associated one of the signals; and upon detecting a network attack, identify an attack pattern in the global behavioral histogram and initiate a mitigation action for another of the source IP addresses based on a correlation of one of the individual behavioral histograms to the attack pattern, wherein the one of the individual behavioral histograms corresponds to the another of the source IP addresses, wherein initiating the mitigation action for the another of the source IP addresses comprises:

use an amount of the correlation to generate a confidence score for the another of the source IP addresses, the confidence score being a measure of a likelihood of the another of the source IP addresses contributing to the network attack associated with the attack pattern;

determine that the confidence score for the another of the source IP addresses exceeds a threshold score; and in response to determining that the confidence score for the another of the source IP addresses exceeds the threshold score, selectively drop packets from the another of the source IP addresses at a rate proportional to the likelihood of the another of the source IP addresses contributing to the network attack associated with the attack pattern.

7. The non-transitory computer readable medium of claim 6, wherein selectively dropping packets from the another of the source IP addresses comprises randomly dropping one or more received packets corresponding to the another of the source IP addresses at the rate proportional to the confidence score.

8. The non-transitory computer readable medium of claim 6, wherein the executable code when executed by the one or more processors further causes the one or more processors to identify the attack pattern in the global behavioral histogram based on a deviation of one or more values of one or more of the bins of the global behavioral histogram from a threshold value.

9. The non-transitory computer readable medium of claim 6, wherein the threshold score is representative of the another of the source IP addresses being more likely than not of contributing to the network attack associated with the attack pattern.

10. The non-transitory computer readable medium of claim 6, wherein the network attack is detected by comparing the global behavioral histogram to a plurality of stored model histograms.

11. A security management apparatus, comprising memory comprising programmed instructions stored thereon and one or more processors configured to be capable of executing the stored programmed instructions to:
monitor received requests associated with source Internet Protocol (IP) addresses to obtain data for signals;
update bins corresponding to one or more of the signals for individual behavioral histograms and a global behavioral histogram based on the signal data, wherein each of the individual behavioral histograms comprises two or more of the bins and corresponds to one of the source IP addresses and each of the two or more of the bins maintains a number of the requests associated with the one of the source IP addresses that include a respective value for an associated one of the signals; and
upon detecting a network attack, identify an attack pattern in the global behavioral histogram and initiate a mitigation action for another of the source IP addresses based on a correlation of one of the individual behavioral histograms to the attack pattern, wherein the one of the individual behavioral histograms corresponds to the another of the source IP addresses, wherein initiating the mitigation action for the another of the source IP addresses comprises:
use an amount of the correlation to generate a confidence score for the another of the source IP addresses, the confidence score being a measure of a likelihood of the another of the source IP addresses contributing to the network attack associated with the attack pattern;
determine that the confidence score for the another of the source IP addresses exceeds a threshold score; and
in response to determining that the confidence score for the another of the source IP addresses exceeds the threshold score, selectively drop packets from the another of the source IP addresses at a rate proportional to the likelihood of the another of the source IP addresses contributing to the network attack associated with the attack pattern.

12. The security management apparatus of claim 11, wherein selectively dropping packets from the another of the source IP addresses comprises randomly dropping one or more received packets corresponding to the another of the source IP addresses at the rate proportional to the confidence score.

13. The security management apparatus of claim 11, wherein the one or more processors are further configured to be capable of executing the programmed instructions stored in the memory to identify the attack pattern in the global behavioral histogram based on a deviation of one or more values of one or more of the bins of the global behavioral histogram from a threshold value.

14. The security management apparatus of claim 11, wherein the threshold score is representative of the another of the source IP addresses being more likely than not of contributing to the network attack associated with the attack pattern.

15. The security management apparatus of claim 11, wherein the network attack is detected by comparing the global behavioral histogram to a plurality of stored model histograms.

16. A network traffic management system, comprising one or more security management apparatuses or server devices with memory comprising programmed instructions stored thereon and one or more processors configured to be capable of executing the stored programmed instructions to:
monitor received requests associated with source Internet Protocol (IP) addresses to obtain data for signals;
update bins corresponding to one or more of the signals for individual behavioral histograms and a global behavioral histogram based on the signal data, wherein each of the individual behavioral histograms comprises two or more of the bins and corresponds to one of the source IP addresses and each of the two or more of the bins maintains a number of the requests associated with the one of the source IP addresses that include a respective value for an associated one of the signals; and
upon detecting a network attack, identify an attack pattern in the global behavioral histogram and initiate a mitigation action for another of the source IP addresses based on a correlation of one of the individual behavioral histograms to the attack pattern, wherein the one of the individual behavioral histograms corresponds to the another of the source IP addresses, wherein initiating the mitigation action for the another of the source IP addresses comprises:
use an amount of the correlation to generate a confidence score for the another of the source IP addresses, the confidence score being a measure of a likelihood of the another of the source IP addresses contributing to the network attack associated with the attack pattern;
determine that the confidence score for the another of the source IP addresses exceeds a threshold score; and
in response to determining that the confidence score for the another of the source IP addresses exceeds the threshold score, selectively drop packets from the another of the source IP addresses at a rate proportional to the likelihood of the another of the source IP addresses contributing to the network attack associated with the attack pattern.

17. The network traffic management system of claim 16, wherein selectively dropping packets from the another of the source IP addresses comprises randomly dropping one or more received packets corresponding to the another of the source IP addresses at the rate proportional to the confidence score.

18. The network traffic management system of claim 16, wherein the one or more processors are further configured to be capable of executing the stored programmed instructions to identify the attack pattern in the global behavioral histogram based on a deviation of one or more values of one or more of the bins of the global behavioral histogram from a threshold value.

19. The network traffic management system of claim 16, wherein the threshold score is representative of the another of the source IP addresses being more likely than not of contributing to the network attack associated with the attack pattern.

20. The network traffic management system of claim 16, wherein the network attack is detected by comparing the global behavioral histogram to a plurality of stored model histograms.

* * * * *